United States Patent [19]

Gilles et al.

[11] Patent Number: 5,561,797

[45] Date of Patent: Oct. 1, 1996

[54] METHOD FOR SYNCHRONIZING TRANSACTION PROCESSING IN A DISTRIBUTED HETEROGENEOUS SYSTEM

[75] Inventors: Robert A. Gilles, Santa Cruz, Calif.; Robert J. Grafe, Austin, Tex.; Robert D. Jackson, Murphys; Roger A. Reinsch, Cupertino, both of Calif.; Richard R. Sanders, Rochester, Minn.; Jacob Slonim, Toronto, Canada; Melvin R. Zimowski, San Jose, Calif.

[73] Assignee: International Business Machines Corporation, Armonk, N.Y.

[21] Appl. No.: 425,675

[22] Filed: Apr. 18, 1995

Related U.S. Application Data

[63] Continuation of Ser. No. 32,089, Mar. 15, 1993, abandoned.

[51] Int. Cl.$^6$ .............................. G06F 15/00; G06F 17/00
[52] U.S. Cl. ............... 395/600; 395/200.03; 395/200.11; 395/200.19; 395/182.1; 364/DIG. 1; 364/282.1; 364/282.4; 364/284.4
[58] Field of Search .............................. 395/600, 200.03, 395/200.19, 200.11, 182.1; 364/DIG. 1

[56] References Cited

U.S. PATENT DOCUMENTS

| | | | |
|---|---|---|---|
| 4,507,751 | 3/1985 | Gawlick et al. | 364/200 |
| 4,714,995 | 12/1987 | Materna et al. | 364/200 |
| 4,868,744 | 9/1989 | Reinsch et al. | 364/280 |
| 4,881,166 | 11/1989 | Thompson et al. | 364/200 |
| 4,982,325 | 1/1991 | Tignor et al. | 364/200 |
| 5,046,002 | 9/1991 | Takashi et al. | 395/600 |
| 5,065,311 | 11/1991 | Masai et al. | 364/200 |
| 5,095,421 | 3/1992 | Freund | 395/650 |
| 5,115,392 | 5/1992 | Takamoto et al. | 395/650 |
| 5,142,470 | 8/1992 | Bristow et al. | 364/184 |
| 5,212,788 | 5/1993 | Lomet et al. | 395/600 |
| 5,241,675 | 8/1993 | Sheth et al. | 395/600 |
| 5,261,069 | 11/1993 | Wilkinson et al. | 395/425 |
| 5,261,089 | 11/1993 | Coleman et al. | 395/600 |
| 5,335,343 | 8/1994 | Lampson et al. | 395/182.17 |
| 5,363,121 | 11/1994 | Freund | 395/600 |
| 5,363,505 | 11/1994 | Maslak et al. | 395/650 |
| 5,432,926 | 7/1995 | Citron et al. | 395/182.02 |
| 5,452,445 | 9/1995 | Hallmark et al. | 395/600 |
| 5,491,822 | 2/1996 | Allen et al. | 395/700 |

OTHER PUBLICATIONS

European Search Report, 09.02.95, 94301336.7 (3 pages).
EP-A-0 457 116 (IBM) Abstract, column 1, line 1—column 6, line 39, claims 1–31, Nov 21, 1991.
Data Communications, vol. 12, No. 10, 1983, New York US pp. 183–192, J. Gray et al. "Solving the Problems of Distributed Databases", p. 191, left column, line 9, line 28, FIG. 5.
Informatik Spectrum, vol. 4, 1981, Springer Verlag, Berlin, Heidelberg, New York pp. 175–184 P. Dadam "Synchronisation in Verteilten Datenbanken–Ein Uberblick (Teil 1) " The whole Document.

*Primary Examiner*—Thomas G. Black
*Assistant Examiner*—Jean R. Homere
*Attorney, Agent, or Firm*—Baker, Maxham, Jester & Meador

[57] ABSTRACT

The invention provides transaction synchronization in the form of COMMIT processing in a distributed, heterogeneous database system wherein some resources are synchronized to a transaction by a single-phase commit procedures while other resources synchronize by multi-phase commit procedures. The invention invests an application requestor at an application site with authority to represent all single-phase commit resources in multi-phase commit processing.

13 Claims, 4 Drawing Sheets

METHOD FOR SYNCHRONIZING TRANSACTION PROCESSING IN A DISTRIBUTED HETEROGENEOUS SYSTEM

This application is a file wrapper continuation of U.S. patent application Ser. No. 08/032,089, filed Mar. 15, 1993, now abandoned.

CROSS REFERENCE TO RELATED CO-PENDING PATENT APPLICATION

This application contains material which is related to pending U.S. patent application Ser. No. 07/682,041, filed Mar. 27, 1991.

TECHNICAL FIELD

The invention relates to distributed, transaction-oriented database systems, and more particularly, those systems which must coordinate transaction processing at a plurality of sites some, but not all, of which, support a multi-phase transaction synchronization procedure.

BACKGROUND OF THE INVENTION

As pointed out by C. J. Date in "An Introduction to Database Systems", Vol. 2, Addison-Wesley Publishing Company, 1983, the purpose of a database system is to carry out transactions. A transaction is a unit of work that consists of the execution of an application-specified sequence of operations initiated with a BEGIN transaction operation, including one or more UPDATE and/or READ database access operations, and ending with either a COMMIT or BACKOUT operation. A COMMIT operation signals successful termination of a transaction; while a BACKOUT operation denotes unsuccessful termination of a transaction due to abnormal circumstances.

The COMMIT and BACKOUT operations are employed to ensure the atomic property for transactions. Relatedly, a transaction either succeeds or fails. In succeeding, the results of the transaction are made permanent (committed); in failing, all effects of the unsuccessful transaction are removed (backed out).

Transaction oriented systems include a recovery manager, or equivalent, which is typically a procedure or set of procedures that operate to maintain the atomic nature of transactions and to re-establish system operation after failure. The recovery manager maintains atomicity by means of a transaction synchronization procedure. Such procedures are commonly called "commit" procedures.

In a transaction-oriented system which includes either a single site where transaction operations are executed or which permits such operations to be executed at only one site during any transaction, transaction atomicity is enforced by a single-phase synchronization operation. In this regard, when the transaction is completed, the recovery manager requests that the site make permanent all changes to the database occurring during the transaction. In response, the site, in a single phase, either commits or backs out the changes and reports the commit or backout to the recovery manager.

In distributed database systems encompassing a multiplicity of sites, each of which may include a database, a transaction may cause changes to be made at more than one site. In such a system, atomicity can be guaranteed only if all of the sites involved in the transaction agree on its outcome. As described by H. F. Korth, et al in "Database System Concepts", McGraw-Hill Book Company, Copyright 1986, distributed database systems can use a transaction synchronization procedure called two-phase commit protocol to guarantee atomicity. In this regard, assume that a transaction ends successfully at an execution site and a recovery manager requests that all database sites commit database access operations involved in the transaction. In the first phase of the protocol, all involved database sites are requested to prepare to commit. In response, the sites individually decide, based upon local conditions, whether to commit or back out their operations. The decisions are communicated to a synchronization location where the "votes" are counted. In the second phase, if all sites vote to commit, a request to commit is issued, in response to which all of the sites commit their operations. On the other hand, if any site votes to back out its operation, all sites are instructed to back out their operations.

There may be distributed database systems embracing a plurality of sites in which some sites may employ a two-phase commit protocol, while other sites are only capable of conducting a single-phase operation. In the Description which follows, such systems are called "distributed, heterogeneous database systems". A distinct peril in distributed, heterogeneous database systems is posed by a transaction which may update at more than one site. If a first update site supports only a single-phase commit protocol, while a second site supports a two-phase protocol, commitment at either site cannot be undone if it precedes backout at the other. One solution is to limit transactions to updating only a single site in all cases. However, this sacrifices the speed and flexibility inherent in a distributed system.

Accordingly, there is manifest need in distributed, heterogeneous database systems to ensure transaction atomicity by providing coordination between single-phase and multi-phase commit processing in order to preserve the ability to update at multiple sites without having to incur the expense to upgrade all sites to two-phase operation.

THE INVENTION

It is the object of this invention to provide a method for synchronizing transaction processing in a distributed, heterogeneous database system with a plurality of sites. It is a related object to have the method utilize a constraint in which if updating is not requested at multiple resource sites in the transaction, then update privileges are limited to the first resource site that updates in the transaction, or, if updating is requested at multiple resource sites in the transaction, then update privileges are granted only to those resource sites that are supported by multi-phase commit processing.

The invention is practiced on a distributed, heterogeneous database system with a plurality of sites, wherein the system includes at least one application site with a processor for executing an application program which executes transactions, and an application requestor procedure for forwarding application transaction requests and receiving responses to transaction requests. The system further includes a plurality of resource sites, including at least one first resource site having a database, a database management system for performing database access operations in response to transaction requests, under control of a single phase transaction synchronization procedure, and a server for receiving transaction requests and forwarding responses to transaction requests, and at least a second resource site including a database, a database management system for performing database access operations in response to transaction requests, under control of a multi-phase transaction coordination procedure, and a server for receiving transaction requests and forwarding responses to transaction requests, and a communication facility connecting all sites of the plurality of sites for communication therebetween.

In such a system context, the method includes the steps of executing a transaction at an application site, the transaction including at least one database access operation at a resource site; issuing a transaction synchronization request from the application site and communicating the transaction synchronization request to the application requestor; determining at the application requestor whether any of the first resource sites performed database access operations during the transaction; and, (a) if only first resource sites performed database access operations during the transaction, communicating transaction commit requests from the application requestor to all such first resource sites, conducting single-phase transaction synchronization procedures at all such first resource sites in response to the transaction commit requests, and communicating the results of such single-phase transaction synchronization procedures to the application site; otherwise, (b) if the first resource sites and second resource sites perform database access operations during the transaction: first, communicating transaction commit requests to all such second resource sites and to the application requestor, and commencing a multi-phase transaction synchronization procedure including all such second resource sites and the application requestor, communicating transaction synchronization requests from the application requestor to all such first resource sites, conducting single-phase transaction procedures at all such first resource sites, and communicating results of such single-phase transaction synchronization procedures to the application site; followed by, completing the multi-phase transaction synchronization procedure, and communicating results of the multi-phase transaction synchronization procedure to the application site; and, either committing or backing out the transaction in response to results of the transaction synchronization procedures.

The method is executed according to two constraints:

Constraint 1: if the application does not request updating at multiple resource sites in a transaction, then the first resource site that updates in the transaction is given sole update privileges.

Constraint 2: if the application does request updating at multiple resource sites in a transaction, then only resource sites that are capable of conducting multi-phase commit processing are given update privileges.

DESCRIPTION OF THE PREFERRED EMBODIMENT

Figure 1:
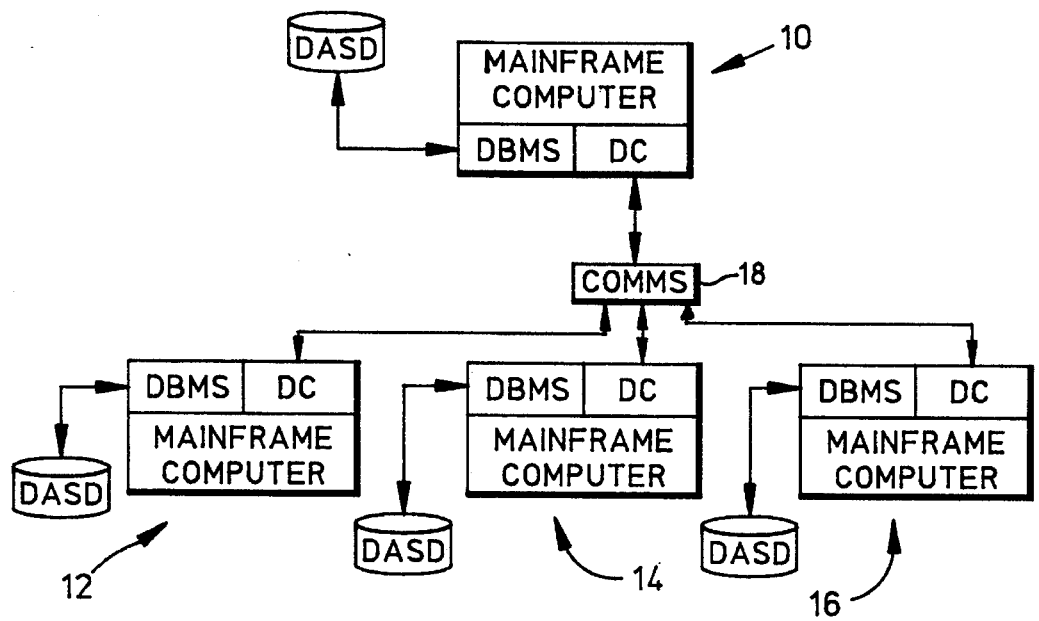
FIG. 1 is a block diagram illustrating a first embodiment of distributed heterogeneous database system in which the invention is practiced.

In FIG. 1, the general outline of physical architecture in which the invention is implemented is illustrated. In FIG. 1, the system is a distributed database system comprising four sites. At an application site 10 a mainframe computer of the Enterprise System (ES) 9000 type running a multiple virtual storage (MVS) operating system executes a transaction-based application program that accesses a database on a direct access storage device (DASD) by way of a database management system (DBMS) such as the well-known DB2 product available from the assignee of this invention. The application site 10 is enabled to communicate with similarly-constructed resource sites 12, 14, 16 by way of a data communications (DC) facility coupled to corresponding DC facilities at the resource sites through a communication (COMMS) structure 18. The transaction-based application program executing at the application site 10 is enabled to access databases at the resource sites 12, 14, 16 through a standard system interface such as the well-known systems application architecture (SAA) or systems network architecture (SNA) by peer-to-peer protocols implemented in, for example, the well-known LU6.2 architecture extension.

Figure 2:
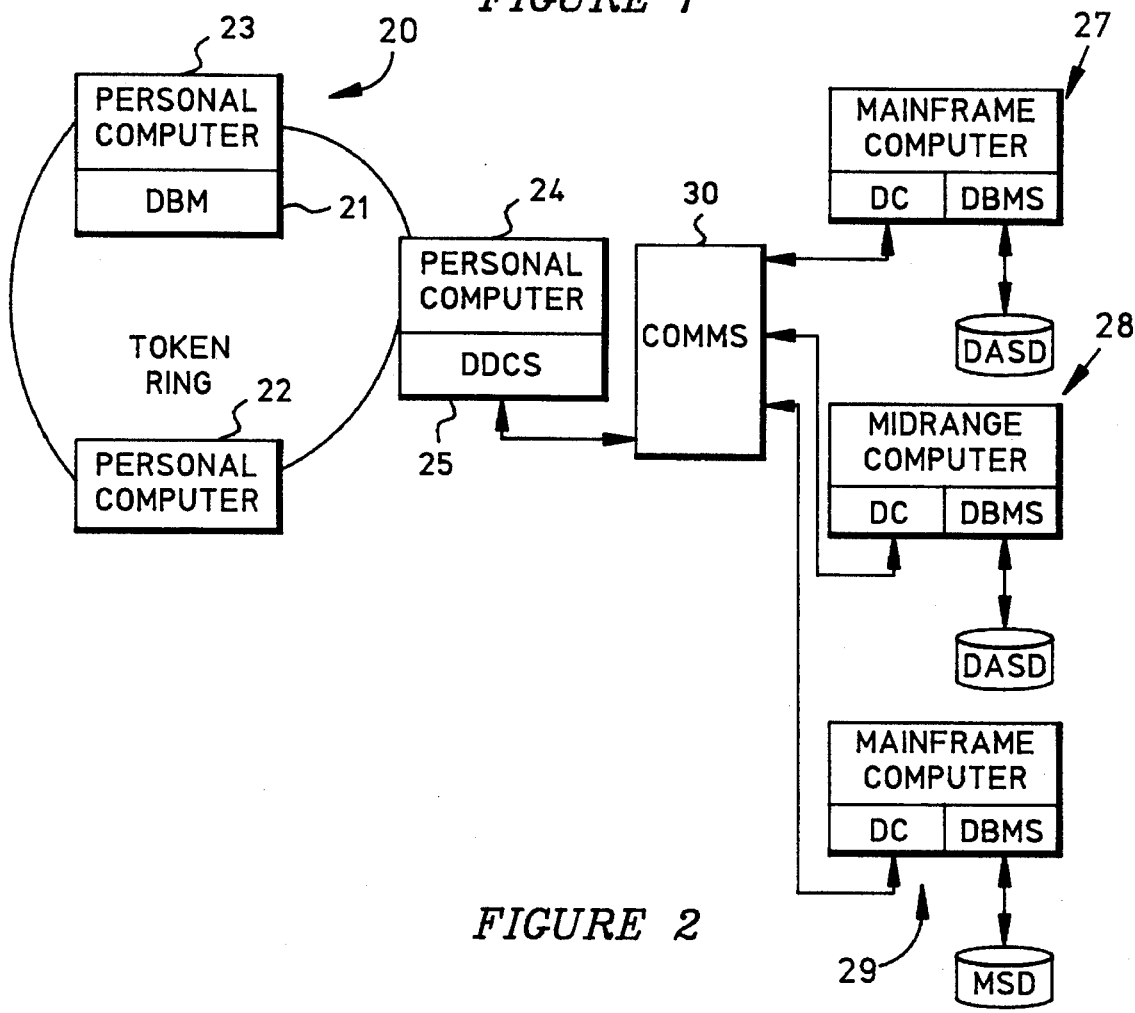
FIG. 2 is a block diagram illustrating an alternate distributed, heterogeneous database system in which the invention may be practiced.

FIG. 2 illustrates an alternative physical architecture for practicing the invention. Herein, the application site 20 may comprise, for example, personal computers of the PS/2 type which include OS2 operating systems. The personal computers 22, 23, 24 are linked together in a conventional token ring architecture. A transaction-based application program executes in the personal computer 22, which is also configured with a conventional database manager (DBM) 21. The personal computer 23 functions as an application server to the application program executing in the personal computer 22, while personal computer 24 operates as a gateway device which includes distributed data connection services (DDCS) 25 for communicating database access requests to, and receiving responses from, resource sites 27, 28, 29 through a COMMS facility 30. Exemplary product architectures for the resource sites include, for example, at the resource site 27 an Enterprise System 9000 series mainframe computer operating under a MVS operating system and executing a DBMS such as DB2 for accessing a database on a DASD. Peer-to-peer communications are conducted between the DDCS 25 and a data communications service (DC) at resource site 27. The resource site 28 can comprise, for example, a mid-range computer of the OS/400 type operating under an OS/400 operating system which includes a DBMS and which may include an SQL/400 precompiler for application development and queue management. These products are all available from the assignee of this invention. Peer-to-peer communications are provided between the application site 20 and the resource site 28 by the DDCS 25 and DC services at the resource site 28. The resource site 29 can include, for example, an Enterprise System 9000-type mainframe computer operating under the well-known virtual machine (VM) operating system and executing a DBMS such as the SQL/VS available from the assignee. Peer-to-peer data communications between the application site 20 and the resource site 29 are provided by way of the DDCS 25 a data communication (DC) service at the resource site 29.

Figure 3:
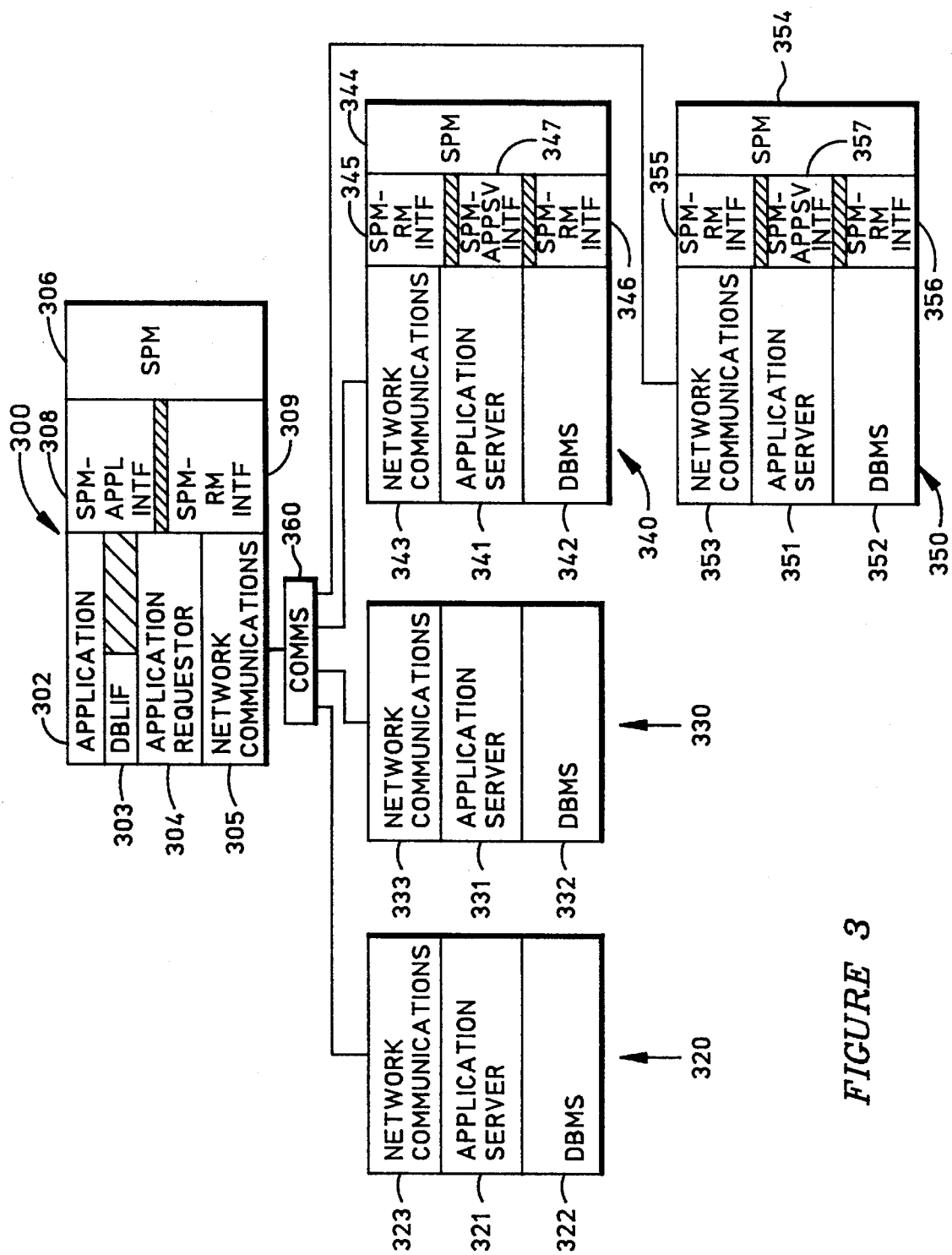
FIG. 3 is a block diagram illustrating the logical architecture of a distributed, heterogeneous database system in which the invention is practiced.

In FIG. 3, a general view of the system logical architecture in which the invention is implemented is illustrated. Herein, at an application site 300, a transaction-based application process 302 executes in conjunction with a database language interface (DBL IF) 303 for conventional transaction-based database operations. The application program 302 and DBL IF 303 are served by an application requestor 304 which acts on their behalf in forwarding requests to, and receiving responses from, distributed database resources. A network communication service 305 provides a data communication interface with resource sites of the distributed database system. Preferably, the network communication service 305 provides logical connections ("sessions") between logic unit (LU) peers. The application site 302 also includes as a part of the operating services a synchronization point (synchpoint) manager (SPM) 306 which has logical interfaces 308 and 309. The logical interface 308 is between the SPM 306 and the application program 302 and between the SPM 306 and the application requestor 304 when the application requestor acts on behalf of the application program 302. The interface 309 is an SPM-to-resource manager (RM) interface which operates between the SPM 306 on the one hand and the requestor 304 and network communications server 305 on the other hand.

The application requestor 304 is a procedure which executes in a processor with the application program 302 and is treated as a resource manager (RM). The SPM 306 (which also may be called a recovery manager) is a component of the operating environment that coordinates commit and backout operations among various distributed resources by means of the two-phase commit procedure described above. The presence of the SPM 306 makes any resource at the application site 300 that uses an SPM-RM interface a "protected resource". Resources having no access to an SPM are "unprotected". The SPM 306 communicates with peer logical units. In the invention, the peers of the SPM 306 are other SPMs, the application requestor, and any other resource manager that can conduct a session with the SPM 306.

The system of FIG. 3 is a distributed heterogeneous database system in that the resource sites 320 and 330 are unprotected, while the resource sites 340 and 350 are protected. The logical architectures of the unprotected resource sites are essentially equivalent and include an application server, a database management system (DBMS), and network communication services. Each of the DBMSs 322 and 332 is capable of conducting database access operations in response to transaction requests issued by the application program 302 and synchronizing those operations with transaction activity by a single-phase commit protocol. The protected resource sites 340 and 350 have essentially equivalent architectures which include an application server, a DBMS, a network communication service, and an SPM. Interfaces are provided between the SPM and resource managers including the network communication service and the DBMS, and between the SPM and the application server. A communication facility (COMMS) 360 interconnects the application site and the resource sites in a conventional architecture such as wide area network (WAN) or local area network (LAN) for communication between the application site and the resource sites.

For an understanding of distributed database systems which are not necessarily heterogeneous, reference is given to the following IBM publications for greater detail:
1. Systems Application Architecture—Common Programming Interface Resource Recovery Reference, SC31-6821-00, Copyright 1991;
2. Distributed Data Library—Distributed Relational Database Architecture Reference, SC26-4651-00, Copyright 1991; and
3. Systems Network Architecture—LU6.2 Reference: Peer Protocols, SC31-4808, Copyright 1991.

Figure 4:
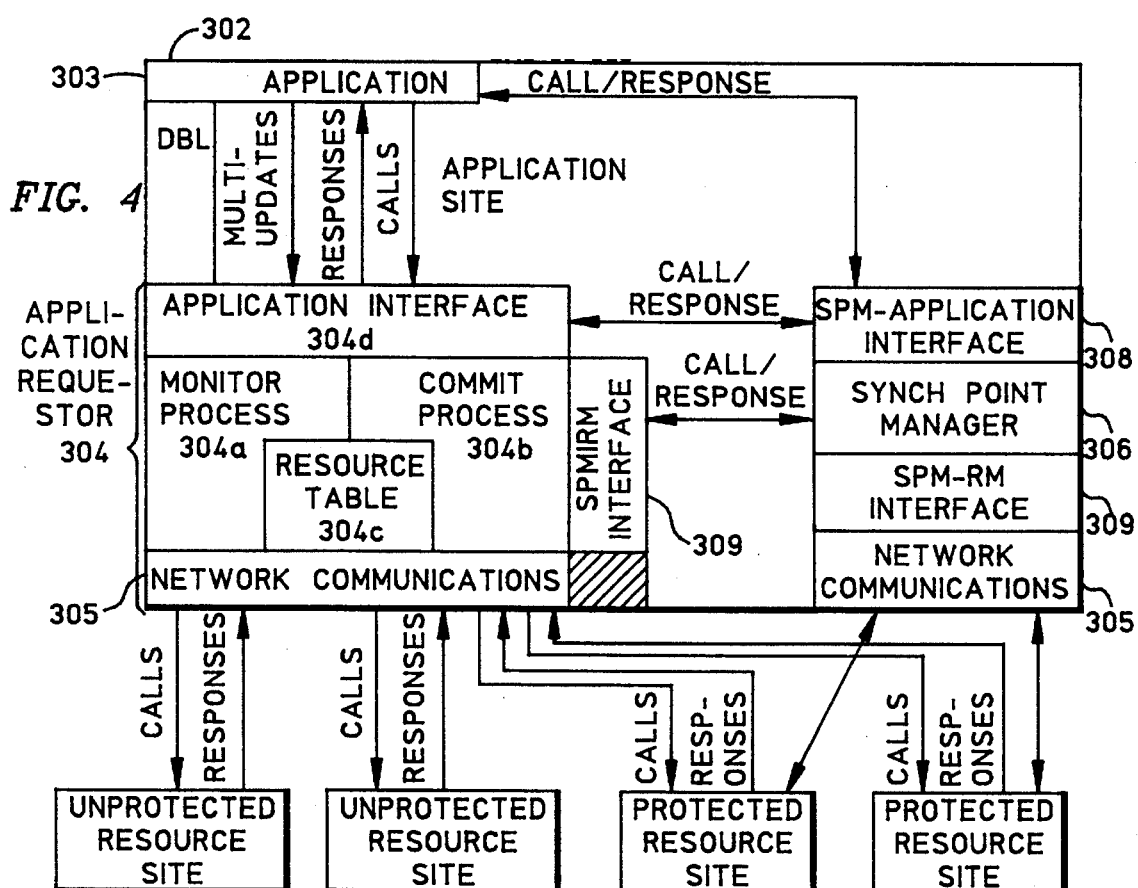
FIG. 4 shows in more detail the logical components and connections of an application site.

FIG. 4 illustrates, in more detail, the logical structure of the application site 300 and its interconnection with protected and unprotected resource sites 302, 330, 340, 350. The application requestor 304 is presumed to include all requestor functionality found in currently-available products that implement the Distributed Relational Database Architecture described in the above-referenced IBM document SC26-4651-00. In addition, to implement the invention, the application requestor 304 includes a monitor process 304a, a commit process 304b, and a resource table 304c. The interface 304d between the application requestor 304 and the application program 302 receives from the application program an indication (MULTI-UPDATES) of whether multiple resource sites may be updated during a transaction. The application 302 and the application requestor 304 conduct interprocess communication by a call/response protocol. Similarly, interprocess call/response communication is provided between the application 302 and the SPM 306, between the SPM 306 and protected resource sites 340 and 350 by way of protected conversations provided by the network communications service 305, between the SPM 306 and the application requestor 304 through the interface 309, and between the application requestor 304 and the unprotected resource sites 320 and 330. In addition, the application requestor 304 may issue a call to the SPM 306 on behalf of the application program 302 through the interface 308.

MONITOR PROCESS

The monitor process 304a of the application requestor 304 sets up and monitors the environment of the distributed heterogeneous database system by implementing constraints that limit which resources are allowed to conduct UPDATE operations and which are restricted to READ operations only. The constraints are as follows:

Constraint 1: if the application program does not request updating at multiple resource sites in the transaction (MULTI-UPDATES not set), then the first resource site that updates in the transaction is given exclusive updating privileges.

Constraint 2: if the application does request updating at multiple resource sites (MULTI-UPDATES set) in the transaction, then only protected resource sites involved in the transaction are given update privileges.

Thus, the condition of the MULTI-UPDATES indication given to the application requestor 304 enables the application requestor to apply the correct constraint. In the preferred embodiment, Constraint 1 applies when a transaction is not under SPM control. The transaction subject to this constraint can allow only one resource site to update in any given transaction. This restriction is required to guarantee the atomicity of the transaction. Constraint 2 is for transactions that are under SPM control in which multiple resource sites are allowed to update. Implicit in this constraint is the restriction that the only resource sites allowed to update must have and use SPM support. All other resource sites are restricted to read-only operations.

Whether an application is updating multiple resource sites or not is not defined by this invention. The invention requires only that this information be provided by some environmental source, such as the application program, to the application requestor. Since the application requestor represents the application program for distributed transactions and since all distributed transaction requests go through the application requestor, the requestor is responsible in this invention to monitor the environment in terms of ensuring that the transaction can properly synchronize its manifold operations.

The application requestor is enabled to monitor the environment by provision of a distributed reply message in which any resource site responding to a transaction request informs the application requestor when it receives its first request for an update and again any time in the transaction that it receives a request to perform an update. The application requestor collects the information into the resource table 304c, keeping track of which resource sites are allowed updates, and backs out the transaction if an update occurs that would prevent a reliable synchronized commit across all resource sites.

Tables IA–ID illustrate the monitor process under Constraint 1. These tables are a succession of instantiations of the resource table 304c; the first four table columns are of interest to the monitor process. Initially, in table IA, as a resource site is engaged in the transaction, it will be identified in the first column. When a resource site (RS) responds to an initial transaction request, it will also provide an indication of whether it is protected or not. Thus, in the second column of tables IA–ID, the three involved resource sites are unprotected. The third column of the tables logs update messages received from resource sites. In this regard, each time a resource site receives an UPDATE REQUEST message, it will respond to the application requestor with an UPDATE REQUESTED message. The first of these messages is received from RS2 and is entered into the third column (Table IB). Immediately, the fourth column values are changed to permit RS2 to update and to indicate that RS1 and RS3 are not permitted to update. Now, if the application requestor receives an UPDATE REQUESTED message from either RS1 or RS3, it will initiate backout of the entire transaction. On the other hand, when a COMMIT command is issued for the transaction, successful commit processing will result in the transitions of the third and fourth columns of the resource table as indicated in tables IC and ID. This COMMIT processing is explained in more detail below.

The states of the resource table under Constraint 2 are illustrated in tables IIA and IIB. In these tables, only the two protected resource sites, RS3 and RS4, are permitted to update, they may update concurrently as implied by table IIB. Table IIC illustrates a special case which system design and operation considerations may demand. Relatedly, the application requestor, upon receiving an UPDATE REQUESTED message from an unprotected resource (RS1) disables all other resource sites, including the protected resource sites, from updating. This will preserve atomicity by preventing simultaneous occurrence of single- and multi-phase transaction synchronization procedures.

Figure 5:
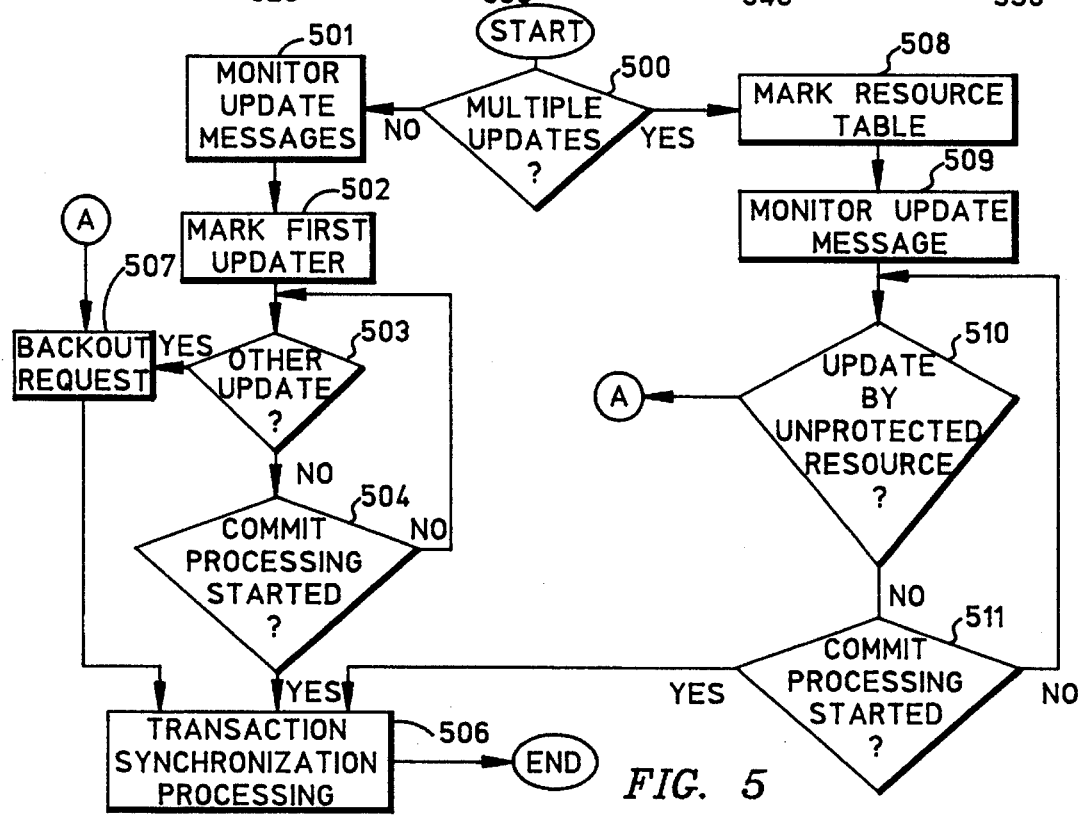
FIG. 5 is a flow diagram which depicts the imposition of two constraints on the method of the invention.

FIG. 5 is a flow chart illustrating the monitor process as conducted in the application requestor according to the invention. Initially, the condition of a MULTI-UPDATES signal is observed in decision 500. If the signal is not set, the negative exit is taken from the decision and UPDATE REQUEST messages are monitored under Constraint 1 as described above. The messages are monitored by means of the resource table in step 501 and the first updater is marked in the table in step 502. Step 503 monitors database access operations with reference to the resource table during processing of the transaction. Assuming normal operation in which no other resource sites issue UPDATE REQUESTED messages, the process loops through decisions 503 and 504 until the command is issued to commit the transaction. Transaction synchronization processing is conducted in step 506. In the event that a resource site which has been forbidden to update indicates that it has received an update request, the application requestor 304 takes the positive exit from decision 503 and issues a BACKOUT request 507 which begins transaction synchronization processing leading to a backout at step 506.

When multiple updates are permitted, the positive exit is taken from decision 500. Entries are made in the resource table in step 508 as the transaction unfolds, UPDATE REQUEST messages are marked in step 509, and detection of an attempted update by an unprotected resource site in decision 510 results in a positive exit to the BACKOUT request at step 507. Assuming operation permitted by Constraint 2, the application requestor loops through 510 and 511 until a command is issued to commit the transaction. At this point, positive exit is taken from decision 511 and transaction synchronization processing is undertaken at step 506.

From the standpoint of the application servers 321, 331, 341, and 351 of the resource sites, as each server receives a database access request from the application cite, it processes the request and buffers the results. If an access results in an update, the server application buffers an update indication if a prior update indication was not returned for this transaction and transmits the buffer to the application requestor.

TABLE IA

ALL RESOURCES UNPROTECTED

| Resource ID | Resource Protected | Update Message Accepted | Allowed to Update | Commit State |
|---|---|---|---|---|
| RSI | No | No | Yes | N/A |
| RS2 | No | No | Yes | N/A |
| RS3 | No | No | Yes | N/A |

TABLE IB

| RSI | No | No | No | UN |
|---|---|---|---|---|
| RS2 | No | Yes | Yes | UN |
| RS3 | No | No | No | UN |

TABLE IC

| RSI | No | No | No | Commit |
|---|---|---|---|---|
| RS2 | No | Yes | Yes | UN |
| RS3 | No | No | No | Commit |

TABLE ID

| RSI | No | No | Yes | Commit |
|---|---|---|---|---|
| RS2 | No | No | Yes | Commit |
| RS3 | No | No | Yes | Commit |

TABLE IIA

PROTECTED RESOURCES AND UNPROTECTED RESOURCES

| Resource ID | Resource Protected | Updated Message Accepted | Allowed to Update | Commit State |
|---|---|---|---|---|
| RSI | No | No | Yes | N/A |
| RS2 | No | No | Yes | N/A |
| RS3 | Yes | No | Yes | N/A |
| RS4 | Yes | No | Yes | N/A |

TABLE IIB

| RSI | No | No | No | N/A |
|---|---|---|---|---|
| RS2 | No | No | No | N/A |
| RS3 | Yes | Yes | Yes | N/A |
| RS4 | Yes | Yes | Yes | N/A |

TABLE IIC

| RSI | No  | Yes | Yes | N/A |
| --- | --- | --- | --- | --- |
| RS2 | No  | No  | No  | N/A |
| RS3 | Yes | No  | No  | N/A |
| RS4 | Yes | No  | No  | N/A |

COMMIT PROCESS

The commit process 304b of the application requestor 304 implements protocols to conduct transaction synchronization processing by means of COMMIT and BACKOUT sequencing in a distributed heterogeneous database system. The protocols embrace a sequence of actions that must take place. The exact sequence is dependent on the target of an initial COMMIT or BACKOUT command from the application program. There are three possible targets for the initial COMMIT or BACKOUT command:
1. the SPM of the application site;
2. the application requestor; and
3. one of the resource sites.

If the target is the application site SPM, the SPM coordinates the transaction synchronization procedure involving all of the protected resource sites, the application requestor, and any other resource management peer with whom the SPM has dealt during the transaction. Relatedly, the application requestor is identified to the SPM as a resource manager interested in the transaction so that it is engaged during a two-phase commit process.

If the target of a COMMIT or BACKOUT request is the application requestor, the application requestor acting on behalf of the application program may contact the SPM to begin two-phase commit processing. The application requestor only contacts the SPM if the transaction is under synchpoint control, as when the monitor process is implementing Constraint 2. The SPM will then engage the application requestor to participate in the two-phase commit process.

If the target of a COMMIT or BACKOUT request is a resource site, the resource site does not initiate transaction synchronization processing; instead, it informs the application requestor that a COMMIT or BACKOUT has been requested in the form of a "COMMIT REQUESTED" or a "BACKOUT REQUESTED" message. The application requestor then follows the same procedure as if it had been the target of the requested action.

The invention is based upon the inventors' critical observation that the transaction synchronization operations of single-phase (unprotected) resource sites can be integrated in a distributed heterogeneous database system with two-phase commit processing if the application requestor is enabled to represent all of the unprotected resource sites in the two-phase process. Relatedly, when two-phase commit processing is initiated, the application requestor during phase 1 asks all unprotected resource sites to commit and votes in the two-phase process according to the responses from those resource sites. If all commit, the application requestor votes to commit in phase 1; if any unprotected resource site backs out, the application requestor votes to back out in the first phase. Under the preferred mode of Constraint 2 discussed above, none of the unprotected resource sites will be permitted to update. Consequently, if the application requestor votes to commit in the first phase and one of the protected resource sites votes to back out, no unprotected resource site will be faced with the requirement to back out a committed update.

Below are listed a set of sequences. The sequences describe the steps to COMMIT and BACKOUT a transaction, dependent upon the target of the COMMIT or BACKOUT command from the application program. There are ten sequences, as follows:
1. COMMIT targeted to the application site SPM;
2. COMMIT targeted to a resource site under the condition that Constraint 2 obtains;
3. COMMIT targeted to a resource site under Constraint 1;
4. COMMIT targeted to the application requestor under Constraint 2;
5. COMMIT targeted to the application requestor under Constraint 1;
6. BACKOUT targeted to the application site SPM;
7. BACKOUT targeted to a resource site under Constraint 2;
8. BACKOUT targeted to a resource site under Constraint 1;
9. BACKOUT targeted to the application requestor under Constraint 2; and
10. BACKOUT targeted to the application requestor under Constraint 1.

The sequences are presented in detail below. Following each sequence are comments that correspond to the enumerated steps in the sequence period. The sequences are normal flow sequences and assume no errors occur that prevent transaction synchronization processing from occurring. The invention does account for conditions that result in a BACKOUT command. The actions of the SPM are conventional and are not described in detail. For convenience, the application requestor is referred to as "Requestor", resource sites are called "resources", the application program is called the "application"; and two-phase commit processing is denoted as "synchpoint processing". For two-phase commit processing, the note to commit is called "request commit", commit completion is called "committed", and backout completion is called "backed out".

---

1. Commit targeted to the application site SPM:
    1. Application asks the SPM to commit
    2. SPM asks the requestor to prepare to commit
       SPM asks all protected resources to prepare to commit
    3. Requestor asks all unprotected resources to commit
       All unprotected resources commit and reply to the requestor
    4. Requestor replies to the SPM with a request commit
       All protected resources reply to the SPM with a request commit
    5. SPM asks the requestor to commit
       SPM asks all protected resources to commit
    6. Requestor replies to the SPM with a committed
       All protected resources reply to the SPM with a committed
    7. SPM returns an OK to the application
    Comments
    1. The application asks the SPM to commit the transaction.
    2. Syncpoint processing begins. During phase one of the two phase -continued commit protocol, the SPM asks all resources that are registered for this transaction to prepare to commit the transaction. The requestor is registered for the transaction so it is contacted. The requestor represents the unprotected resources. The SPM may ask the resources and requestor in whatever order it requires. For example, the SPM may ask the protected resources prior to the requestor. The order in which an SPM registers resources and contacts the registered resources is not part of the invention.
   3. The requestor receives the prepare and uses resource specific protocol to commit the unprotected resources. Each unprotected resource commits and replies to the requestor with the status of the transaction at that resource.
   4. The requestor receives the replies from the unprotected resources and if all resources committed the transaction, the requestor replies to the SPM with a request to commit the transaction. Otherwise, the requestor requests a backout. The SPM also receives replies from the protected resources.
   5. During phase two of the two phase commit protocol, the SPM asks the protected resources and the requestor to commit.
   6. The requestor responds to the SPM indicating the transaction is committed. The SPM also receives replies from the protected resources.
   7. When syncpoint processing is complete, the SPM returns the results to the application.
2. Commit targeted to a resource under Constraint 2:
   1. Application asks a resource to commit
   2. Resource replies to the requestor with an indication of commit requested
   3. Requestor asks the SPM to Commit
   See steps 2 through 6 in sequence 1
   9. SPM replies to the requestor with an OK
   10. Requestor replies to the application with the status of the transaction
   Comments
   1. The application asks one of the resources to commit the transaction.
   2. The resource does not commit. It returns a commit requested indication to the requestor.
   3. The requestor receives the commit requested indication and acting on behalf of the application, asks the SPM to commit the transaction.
   See steps 2 through 6 in the comments to sequence 1.
   9. When syncpoint processing is complete, the SPM returns the results to the requestor.
   10. The requestor returns the results to the application.
3. Commit targeted to a resource under Constraint 1:
   1. Application asks a resource to commit
   2. Resource replies to the requestor with an indication of commit requested
   3. Requestor asks all unprotected read only resources to commit
   4. All unprotected read only resources commit and reply to the requestor
   5. Requestor asks the unprotected update resource to commit
   6. The unprotected update resource commits and replies to the requestor
   7. Requester replies to the application with the status of the transaction
   Comments
   1. The application asks one of the resources to commit the transaction.
   2. The resource does not commit. It returns a commit requested indication to the requestor.
   3. The requestor uses resource specific protocol to ask all unprotected read only resources to commit. The read only resources commit and reply to the requestor with the status of the transaction at that resource.
   4. The requestor asks the unprotected update resource to commit. The update resource replies to the requestor.
   5. The requestor returns the results to the application.
4. Commit targeted to the requestor under Constraint 2:
   1. Application asks the requestor to commit
   2. Requestor asks the SPM to commit
   See steps 2 through 6 in sequence 1
   8. SPM replies to the requestor with an OK to the initial commit
   9. Requestor replies to the application with the status of the transaction
   Comments
   1. The application asks the requestor to commit the transaction.
   2. The requestor acting on behalf of the application asks the SPM to commit.
   See steps 2 through 6 in the comments to sequence 1.
   8. When syncpoint processing is complete, the SPM returns the results to the requestor.

-continued

9. The requestor returns the results to the application.
5. Commit targeted to the requestor under Constraint 1:
    1. Application asks the requestor to commit
    2. Requestor asks all unprotected read only resources to commit
       All unprotected read only resources commit and reply to the requestor
    3. Requestor asks the unprotected update resource to commit
       The unprotected update resource commits and replies to the requestor
    4. Requestor replies to the application with the status of the transaction
    Comments
    1. The application asks the requestor to commit the transaction.
    2. The requestor uses resource specific protocol to ask all unprotected read only resources to commit. The read only resources commit and reply to the requestor with the status of the transaction at that resource.
    3. The requestor asks the update resource to commit. The update resource replies to the requestor.
    4. The requestor returns the results to the application.
6. Backout targeted to the application site SPM:
    1. Application asks the SPM to backout
    2. SPM asks the requestor to backout
       SPM asks all protected resources to backout
    3. Requestor asks all unprotected resources to backout all unprotected resources backout and reply to the requestor
    4. Requestor replies to the SPM with a backed out
       All protected resources reply to the SPM with a backed out
    5. SPM returns an OK to the application
    Comments
    1. The application asks the SPM to backout the transaction.
    2. Backout processing begins. The SPM asks all resources that are registered for this transaction to backout. The requestor is registered for the transaction so it is contacted. The requestor represents the unprotected resources. The SPM may ask the resources and requestor in whatever order it requires. For example, the SPM may ask the protected resources prior to the requestor. The order in which an SPM contacts the registered resources is not part of the invention.
    3. The requestor receives the backout and uses resource specific protocol to backout the unprotected resources. The unprotected resources backout and reply to the requestor with the status of the transaction at that resource.
    4. The requestor receives the replies from the unprotected resources and replies to the SPM with a backed out. The SPM also receives replies from the protected resources.
    5. When syncpoint processing is complete, the SPM returns the results to the application.
7. Backout targeted to a resource under Constraint 2:
    1. Application asks a resource to backout
    2. Resource replies to the requestor with an indication of backout requested
    3. Requestor asks the SPM to backout
    See steps 2 through 4 in sequence 6
    7. SPM replies to the requestor with an OK to the backout
    8. Requestor replies to the application with the status of the transaction
    Comments
    1. The application asks one of the resources to backout the transaction.
    2. The resource does not backout. It returns a backout requested indication to the requestor.
    3. The requestor receives the backout requested indication and asks the SPM to backout the transaction.
    See steps 2 through 4 in the comments to sequence 6
    7. When backout processing is complete, the SPM returns OK to the requestor.
    8. The requestor returns the results to the application.
8. Backout targeted to a resource under Constraint 1:
    1. Application asks a resource to backout
    2. Resource replies to the requestor with an indication of backout requested
    3. Requestor asks all unprotected resources to backout, unprotected all resources backout and reply to the requestor
    4. Requestor replies to the application with the status of the transaction
    Comments
    1. The application asks one of the resources to backout the transaction.
    2. The resource does not backout. It returns a backout requested indication to the requestor.
            3. The requestor receives the backout requested indication and uses
                resource specific protocol to backout the unprotected resources.
                The unprotected resources backout and reply to the requestor with
                the status of the transaction at that resource.
            4. The requestor returns the results to the application.
    9. Backout targeted to the requestor under Constraint 2:
            1. Application asks the requestor to backout
            2. Requestor asks the SPM to backout
            See steps 2 through 4 in sequence 6
            6. SPM replies to the requestor with an OK to the backout call
            7. Requestor replies to the application with the status of the
                transaction
            Comments
            1. The application asks the requestor to backout the transaction.
            2. The requestor asks the SPM to backout.
            See steps 2 through 4 in the comments to sequence 6
            6. When backout processing is complete, the SPM returns the results to
                the requestor.
            7. The requestor returns the results to the application.
    10. Backout targeted to the requestor under Constraint 1:
            1. Application asks the requestor to backout
            2. Requestor asks all unprotected resources to backout
                All unprotected resources backout and reply to the request
            3. Requestor replies to the application with the status of the
                transaction
            Comments
            1. The application asks the requestor to backout the transaction.
            2. The requestor uses resource specific protocol to backout the
                unprotected resources. The unprotected resources backout and reply
                to the requestor with the status of the transaction at that
                resource.
            3. The requestor returns the results to the application.

Any time the application requestor conducts transaction synchronization processing under Constraint 1, it uses the resource table to determine the order in which the resource sites are committed our backed out. As Tables IC and ID indicate, and as is laid out in the above-described sequences, the read only resource sites are requested to commit before the update resource site. This order guarantees that, if an update must be backed out, the consistency of the databases will be maintained before and after the transaction is backed out because the read only databases have not been changed by the transaction.

Figure 6:
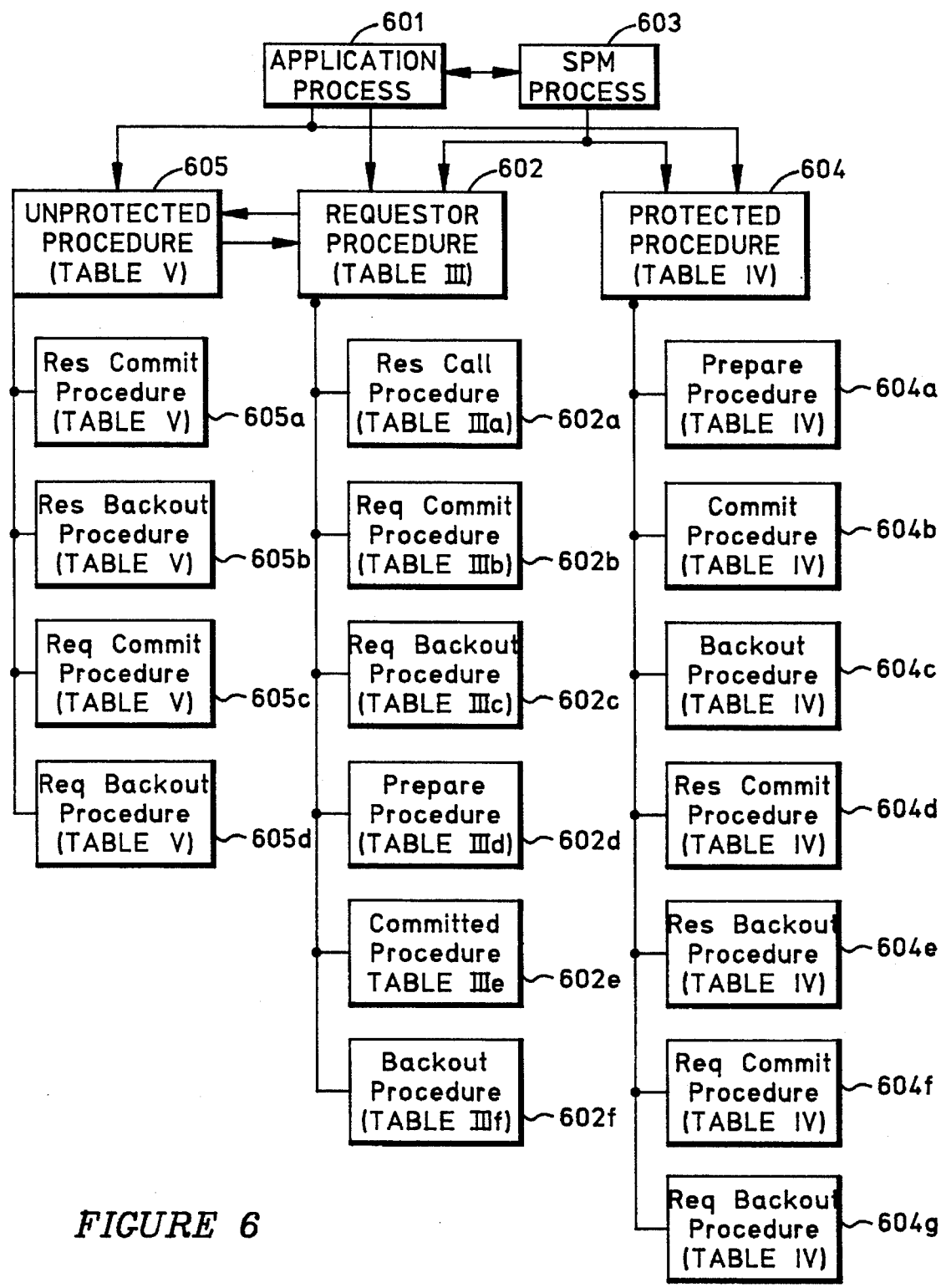
FIG. 6 depicts the flow of control from an application process to a transaction synchronization process in a distributed, heterogeneous database system according to the invention.
Figure 6:
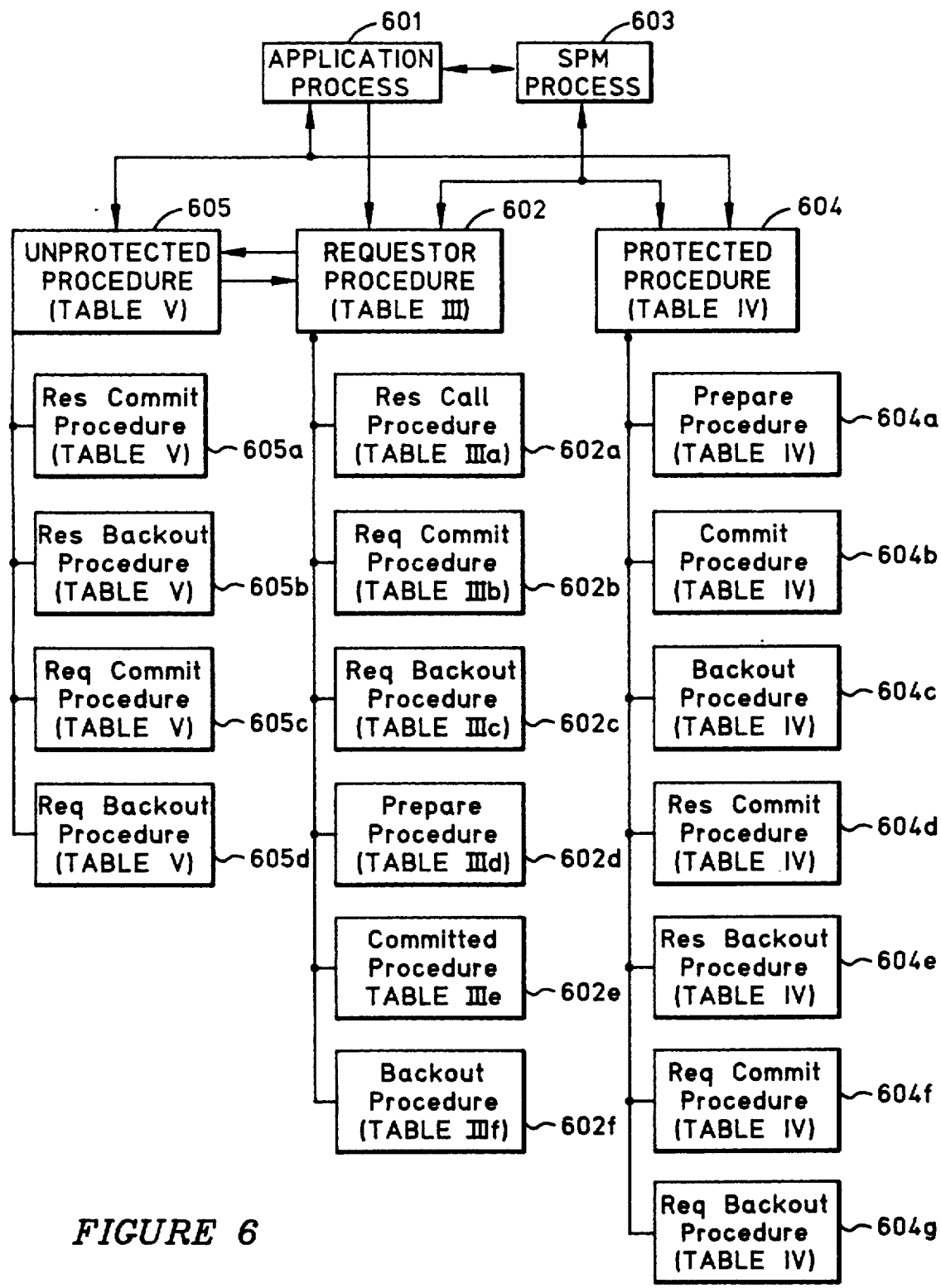

Referring to FIG. 6, the procedures for implementing the commit process performed by the application requestor are set forth.

The application process 601 includes any application program which can execute on any of the physical and logical architectures described herein and, in executing, initiate transaction-based database access operations conducted at one or more separate, distributed databases with transaction synchronization under the control of COMMIT and BACKOUT procedures, or their equivalents. The application process 601 is logically coupled to its application requestor, which includes the requestor procedure 602 as set forth in Table III. The application process 601 is also logically coupled to the SPM process 603, which is conventional and has the structures and functions of the above-described synchpoint manager or an equivalent recovery manager capable of conducting a multi-phase commit procedure. The application servers at the protected resource sites, which are peers of the application requestor, have, in addition to conventionally available functions for application servers that execute in conjunction with an SPM, the functions represented by the protected procedure block 604, as set forth in Table IV. Similarly, the application servers at unprotected resource sites have, in addition to conventional functionality, the functions represented by the unprotected procedure block 605, as set forth in Table V. Together, the processes represented by the blocks 602, 604, and 605 implement the commit process sequences described above.

The application process 601 calls the SPM process 603, the requestor procedure 602, and the protected and unprotected procedures 604 and 605. The requestor procedure calls 603, 604, and 605. The SPM process 603 calls 602 and 604. The SPM process 603 calls 602 and 604. The protected procedure 604 calls 602. The unprotected procedure 605 calls 602.

The requestor procedure in TABLE III receives calls and routes them to application requestor procedures set forth in Tables IIIa–IIIc. The procedure ResCall 602a, set forth in Table IIIa, assumes that all calls targeted to resource sites are passed through the application requestor to the resource site via their application servers. The call elicits a reply from the application server at the resource site, with the reply being directed to the application requestor, where it is analyzed, processed if necessary, and sent to their intended recipients and the initial call is processed by the application requestor.

The ReqCommit procedure 602b is set forth in Table IIIb and is invoked when the application requestor is called to commit a transaction. The ReqBackout procedure 602c, set forth in Table IIIc, is invoked in response to a call to the application requestor to backout a transaction. The Prepare, Committed, and Backout procedures 602d, 602e, and 602f (set forth in, respectively, Tables IIId–IIIf) are conducted by the application requestor in response to the first (Prepare) and second (Commit or Backout) phases of a two-phase commit transaction synchronization procedure conducted by SPM.

The Protected procedure 604 routes calls which are made to an application server at a protected resource site from various sources to the appropriate procedures in Table IV. The Prepare, Commit, and Backout procedures of block 604a, 604b, and 604c are called during two-phase transaction synchronization. The procedures ResCommit and ResBackout of block 604d and 604e represent dynamic calls that may be made from the application program which has no knowledge of them at the time it was compiled. Each elicits a request directed to the application server. The invention contemplates that COMMIT and BACKOUT calls originated as the application requestor and directed to protected resource sites violate the protocols of this invention and, accordingly, return command violation indications.

The calls made from the unprotected procedure block 605 return a REQUESTED message to the application requestor if they originate from the application program (block 605a and 605b). In response to COMMIT and BACKOUT calls from the application requestor, the unprotected procedure 605 makes calls to the procedures represented by blocks 605c and 605d to commit or backout unprotected resources.

TABLE III

```
Procedure Requestor (calltype)
        If calltype = Resource call
            then call ResCall;
        If calltype= Requestor commit
            then call ReqCommit;
        If calltype = Requestor backout
            then call ReqBackout;
        If calltype = SPM Prepare
            then call Prepare;
        If calltype = SPM Committed
            then call Committed;
        If calltype = SPM Backout
            then call Backout;
        Return Response to Caller;
```

TABLE IIIA

```
-Procedure ResCall
    Resource targeted call is passed through the requestor to the resource;
If multi-resource update and the reply from the resource is commit
  Then call the SPM to commit the transaction;
If multi-resource update and the reply from the resource is backout
  Then call the SPM to backout the transaction;
If not multi-resource update and the reply from the resource is commit
  Then
    Repeat for all read only resources or until backout occurs
      Send commit command to read only resource;
      If response is backout
        Then
        Repeat for all read only resources
          Send backout command to read only resource;
        End Repeat;
      End then;
    End Repeat;
    If the read only resources backed out
      Then send backout to update resource
      Else
      Send commit to update resource
      If update resource backs out
        Then
          Repeat for all read only resources
            Send backout command to resource;
          End Repeat;
        End then;
      End else;
  End then;
If not multi-resource update and the reply from the resource is backout
  Then
    Repeat for all resources
      Send backout command to resource;
    End Repeat;
  End then;
 Return status of transaction;
-End Procedure ResCall;
```

TABLE IIIB

```
-Procedure ReqCommit
  If multi-resource update
    Then Call the SPM to commit the transaction;
  If not multi-resource update
    Then
      Repeat for all read only resources or until backout occurs
        Send commit command to read only resource;
        If response is backout
          Then
            Repeat for all read only resources
              Send backout command to read only resource;
            End Repeat;
          End then;
      End Repeat;
      If the read only resources backed out
        Then send backout to update resource
        Else
          Send commit to update resource
          If update resource backs out
            Then
              Repeat for all read only resources
              Send backout command to read only resource;
              End Repeat;
            End then;
          End else;
      End then;
    Return status of transaction;
-End Procedure ReqCommit;
```

TABLE IIIC

```
-Procedure ReqBackout
  If multi-resource update
    Then call the SPM to backout the transaction;
  If not multi-resource update
    Repeat for all resources
      Send backout command to resource;
    End Repeat;
  Return status of transaction;
-End Procedure ReqBackout;
```

TABLE IIID

```
-Procedure Prepare
  Repeat for all unprotected resources or until backout occurs
    Send commit command to resource;
    If response is backout
      Then
        Repeat for all unprotected resources
          Send backout command to unprotected resource;
        End Repeat;
      End, then
  End Repeat;
  If the resources backed out
    Then return Backed Out
    Else return Request Commit;
-End Procedure Prepare;
```

TABLE IIIE

```
-Procedure Commit
  Return Committed to the SPM;
-End Procedure Commit;
```

TABLE IIIF

```
-Procedure Backout
  Repeat for all unprotected resources
    Send backout command to resource;
  End Repeat;
  Return OK;
-End Procedure Backout;
End Procedure Requestor;
```

TABLE IV

```
Procedure Protected (calltype)
    If calltype = SPM Prepare
      Then call Procedure Prepare;
    If calltype = SPM Connit
      Then call Procedure Commit;
    If calltype = SPM Backout
      Then call Procedure Backout;
    If calltype = Resource Commit
      Then call Procedure ResCommit;
    If calltype = Resource Backout
      Then call Procedure ResBackout;
    If calltype = Requestor Commit
      Then call Procedure ReqCommit;
    If calltype = Requestor Backout
      Then call Procedure ReqBackout;
    Return response to caller;
    -Procedure Prepare
      Perform first phase processing;
      Return results of first phase processing;
    -End Procedure Prepare;
    -Procedure Commit
      Perform second phase processing;
      Return results of second phase processing;
    -End Procedure Commit;
    -Procedure Backout
      Perform backout processing;
      Return results of backout processing;
```

TABLE IV-continued

```
    -End Procedure Backout;
    -Procedure ResCommit
      Return Request to commit;
    -End Procedure ResCommit;
    -Procedure ResBackout
      Return request to backout;
    -End Procedure ResBackout;
    -Procedure ReqCommit
      Return command violation
    -End Procedure ReqCommit;
    -Procedure ReqBackout
      Return command violation
    -End Procedure ReqBackout;
End Procedure Protected;
```

TABLE V

```
Procedure Unprotected (calltype)
    If calltype = Resource Commit
      Then call Procedure ResCommit;
    If calltype - Resource Backout
      Then call Procedure ResBackout;
    If calltype = Requestor Commit
      Then call Procedure ReqCommit;
    If calltype = Requestor Backout
      Then Call Procedure ReqBackout;
    Return response to caller;
    -Procedure ResCommit
      Return requested to commit;
    -End Procedure ResCommit;
    -Procedure ResRollback
      Return requested to rollback;
    -End Procedure ResRollback;
    -Procedure ReqCommit
      Commit the local resource;
      Return status of transaction at resource;
    -End Procedure Reqcommit;
    -Procedure ReqBackout
      Rollback the local resource;
      Return status of transaction at resource;
    -End Procedure ReqBackout;
End Procedure Unprotected;
```

While only certain preferred features of this invention have been shown by way of illustration, many changes and modifications will occur to those skilled in the art. Accordingly, it is to be understood that the appended claims are intended to cover all such modifications and changes as fall within the true spirit and scope of the invention.

We claim:

1. A method for synchronizing transaction processing in a distributed database system with a plurality of sites, the system having at least one application site with a processor for executing an application program and an application requestor procedure, and a plurality of resource sites, each resource site including a server with a database and a data management processor, the method including the processor-executed steps of:

operating at least one first resource site of the plurality of resource sites under control of a single-phase transaction synchronization procedure;

operating at least one second resource site of the plurality of resource sites under control of a multi-phase transaction synchronization procedure;

executing a transaction at the at least one application site, the transaction including at least one request for a database access operation at a resource site;

issuing a transaction synchronization request from the application site and communicating the transaction synchronization request to the application requestor at the application site;

determining at the application requestor whether any first resource sites performed database access operations during the transaction; and (a) if only one or more first resource sites performed database access operations during the transaction, communicating transaction commit requests from the application requestor to all such first resource sites, conducting single-phase transaction synchronization procedures at all such first resource sites in response to the transaction commit requests, and communicating results of such single-phase transaction synchronization procedures to the application site; otherwise, (b) if one or more first resource sites and one or more second resource sites performed database access operations during the transaction:

first, communicating transaction commit requests to all such second resource sites and to the application requestor and commencing a multi-phase transaction synchronization procedure including all such second resource sites and the application requestor, communicating transaction synchronization requests from the application requestor to all such first resource sites, conducting single-phase transaction synchronization procedures at all such first resource sites in response to the transaction synchronization requests, and communicating results of such single-phase transaction synchronization procedures to the application site;

followed by, completing the multi-phase transaction synchronization procedure and communicating results of the multi-phase transaction synchronization procedure to the application site; and either committing or backing out the transaction in response to results of transaction synchronization procedures communicated to the application site.

2. The method of claim 1, further including:

if the transaction requires a database update operation at a first resource site;

generating a transaction backout request at the application requestor if the transaction requires a database update operation at any other resource site and providing the transaction backout request to the application program; and backing out the transaction.

3. The method of claim 2, wherein step (a) includes:

if any first resource site performed a database update operation during the transaction;

first, communicating transaction commit requests from the application requestor to all first resource sites which conducted database read operations during the transaction, conducting single-phase transaction synchronization procedures at all such first resource sites, and communication results of such single phase transaction procedures to the application requestor; and followed by, communicating a transaction commit request from the application requestor to the first resource site which performed the database update transaction, conducting a single-phase transaction synchronization procedure at the first resource site which performed the database update transaction, and communicating the result of the single-phase transaction synchronization procedure to the application requestor.

4. In a distributed, heterogeneous database system including at least one application processor at which a transaction-based application program executes, a plurality of resource processors at which database access operations are performed and a communication facility linking all processors together, a method for transaction COMMIT processing, the method including the steps of:

executing database access operations at at least one first resource processor under control of a single-phase transaction synchronization procedure;

executing database access operations at at least one second resource processor under control of a multi-phase transaction synchronization procedure;

executing a transaction at the application processor, the transaction including a plurality of database access operation requests;

conducting database access operations in response to the database access operation requests at one or more resource processors;

issuing a request from the application to COMMIT the transaction;

first, commencing a multi-phase COMMIT procedure including all second resource processors which executed database access operations during the transaction and the application processor;

next, conducting single-phase COMMIT procedures at all first resource sites which executed database access operations during the transaction and communicating results of such single-phase COMMIT procedures to the application processor;

followed by, completing the multi-phase COMMIT procedure and communicating results of the multi-phase COMMIT procedure to the application processor; and either committing or backing out the transaction in response to results of the COMMIT procedures communicated to the application processor.

5. The method of claim 4, further including:

if the database access operation requests include an UPDATE request performed at a first resource processor;

generating a transaction backout request if any other UPDATE requests are directed to any other resource processors; and backing out the transaction.

6. A method for synchronizing transaction processing in a system with a plurality of distributed sites at which transaction operations may be performed, the plurality of distributed sites having at least one application site with a processor for executing an application program and an application requestor procedure, and a plurality of resource sites, each resource site including a server with a database and a data management processor, the method including the processor-executed steps of:

operating at least one first resource site of the plurality of resource sites under control of a single-phase transaction synchronization procedure;

operating at least one second resource site of the plurality of resource sites under control of a multi-phase transaction synchronization procedure;

executing a transaction at at least one application processor, the transaction including at least one request for a transaction resource operation conducted at a resource processor;

issuing a transaction synchronization request from the application processor at the at least one application processor and communicating the transaction synchronization request to the requestor means and to all second resource processors which conducted transaction resource operations;

determining at the requestor means whether any first resource processors performed transaction resource operations during the transaction; and (a) if only one or more first resource processors performed transaction resource operations during the transaction, communicating transaction commit requests from the application processor to all such first resource processors, conducting single-phase transaction synchronization procedures at all such first resource processors in response to the transaction commit requests, and communicating results of such single-phase transaction synchronization procedures to the requestor means, otherwise, (b) if one or more first resource processors and one or more second resource processors performed transaction resource operations during the transaction:

first, communicating transaction commit requests to all such resource processors and to the requestor means, conducting a multi-phase synchronization procedure including the requestor means and all such second resource processors, during a first phase of the multi-phase transaction synchronization procedure, communicating commit requests from the application processor to all such first resource processors, conducting single-phase transaction synchronization procedures at all such first resource processors in response to the transaction commit requests, and communicating results of such single-phase transaction synchronization procedures to the requestor means;

followed by, conducting all remaining phases of the multi-phase transaction synchronization procedure and communicating results of the multi-phase transaction synchronization procedure to the application processor; and either committing or backing out the transaction in response to results of the multi-phase transaction synchronization procedure communicated to the application processor.

7. The method of claim 6, wherein the multi-phase transaction synchronization procedure is a two-phase transaction synchronization procedure in which the requestor means and all such second resource processors vote to commit or backout the transaction in a first phase, and the transaction is either committed or backed out in a second phase in response to votes made in the first phase, wherein:

during the first phase, the steps of communicating transaction commit requests to the first resource processors, conducting single-phase transaction synchronization procedures, and communicating results of such single-phase transaction synchronization procedures are performed during the first phase of the two-phase transaction synchronization procedure; and the requestor means votes to commit the transaction during the first phase of the multi-phase transaction synchronization procedure if all such first resource sites commit, or to back out if any such first resource site backs out.

8. A resource manager for synchronizing transactions in a distributed, heterogeneous database with a plurality of resource sites, the resource manager including:

application interface means for receiving requests from a transaction to a plurality of resource sites for access to database resources at one or more of the plurality of resource sites, the requests including requests to unprotected resource sites controlled by single-phase synchronization point management and requests to protected resource sites controlled by multi-phase synchronization point management;

monitor means coupled to the application interface means for granting updating privileges exclusively to a single resource site if the transaction does not request updating at multiple resource sites, and for granting update privileges to a plurality of protected resource sites if the transaction requests updating at more than one resource site; and commit means for committing the transaction by:

(a) if the transaction accessed database resources only at unprotected resource sites, initiating single-phase transaction synchronization procedures at all such unprotected resource sites; otherwise (b) if the transaction accessed database resources at unprotected resource sites and protected resource sites, first, communicating transaction commit requests to all such protected resource sites, conducting a multi-phase transaction synchronization procedure including all such protected resource sites and the resource manager, communicating transaction synchronization requests to all such unprotected resource sites, followed by, completing the multi-phase transaction synchronization procedure by either committing or backing out the transaction in response to results of the transaction synchronization procedures.

9. The resource manager of claim 8, wherein the commit means includes means for generating a transaction backout request if the transaction first updates database resources at an unprotected resource site and then requests that database resources be updated at any other resource site.

10. The resource manager of claim 9, wherein the commit means commits the transaction under condition 10(a) and further by:

if the transaction updated database resources at a first unprotected resource site;

first, conducting single-phase transaction synchronization procedures with all unprotected resource sites where the transaction read database resources; and followed by, conducting a single-phase transaction synchronization procedure with the first unprotected resource site.

11. A resource manager program product for synchronizing transactions in a distributed, heterogeneous database system including a plurality of resource sites, the resource manager program product including:

application interface means for receiving requests from a transaction to a plurality of resource sites for access to database resources at one or more of the plurality of resource sites, the requests including requests to unprotected resource sites controlled by single-phase synchronization point management and requests to protected resource sites controlled by multi-phase synchronization point management;

monitor process means coupled to the application interface means for granting updating privileges exclusively to a single resource site if the transaction does not request updating at multiple resource sites, and for granting update privileges to a plurality of protected resource sites if the transaction requests updating at more than one resource site; and commit process means for committing the transaction by:
  (a) if the transaction accessed database resources only at unprotected resource sites, initiating single-phase transaction synchronization procedures at all such unprotected resource sites; otherwise
  (b) if the transaction accessed database resources at unprotected resource sites and protected resource sites, first, communicating transaction commit requests to all such protected resource sites, conducting a multi-phase transaction synchronization procedure including all such protected resource sites and the resource manager, communicating transaction synchronization requests to all such unprotected resource sites, followed by, completing the multi-phase transaction synchronization procedure by either committing or backing out the transaction in response to results of the transaction synchronization procedures.

12. The resource manager program product of claim 11, wherein the commit process means includes means for generating a transaction backout request if the transaction first updates database resources at an unprotected resource site and then requests that database resources be updated at any other resource site.

13. The resource manager program product of claim 12, wherein the commit process means commits the transaction under condition 28(*a*) and further by:

if the transaction updated database resources at a first unprotected resource site;
    first, conducting single-phase transaction synchronization procedures with all unprotected resource sites where the transaction read database resources; and
    followed by, conducting a single-phase transaction synchronization procedure with the first unprotected resource site.

* * * * *

UNITED STATES PATENT AND TRADEMARK OFFICE
CERTIFICATE OF CORRECTION

Page 1 of 2

PATENT NO. : 5,561,797
DATED : October 1, 1996
INVENTOR(S) : Gilles et al

It is certified that error appears in the above-indentified patent and that said Letters Patent is hereby corrected as shown below:

Delete figure 6 and substitute therefor the attached figure 6.

Col. 16, line 36, delete ", 604,"; and
line 37, delete "The SPM process 603 calls 602 and 604."

Signed and Sealed this

Thirtieth Day of December, 1997

Attest:

BRUCE LEHMAN

Attesting Officer    Commissioner of Patents and Trademarks